(12) United States Patent
Suto

(10) Patent No.: US 12,468,061 B2
(45) Date of Patent: Nov. 11, 2025

(54) ELECTRIC TOOL

(71) Applicant: MAX CO., LTD., Tokyo (JP)

(72) Inventor: Kohei Suto, Tokyo (JP)

(73) Assignee: Max Co., Ltd., Tokyo (JP)

( * ) Notice: Subject to any disclaimer, the term of this patent is extended or adjusted under 35 U.S.C. 154(b) by 699 days.

(21) Appl. No.: 17/410,242

(22) Filed: Aug. 24, 2021

(65) Prior Publication Data

US 2022/0066062 A1    Mar. 3, 2022

(30) Foreign Application Priority Data

Aug. 25, 2020   (JP) .................. 2020-141771

(51) Int. Cl.
*G01V 3/08* (2006.01)
*B23B 39/00* (2006.01)
*B25F 5/00* (2006.01)

(52) U.S. Cl.
CPC .............. *G01V 3/088* (2013.01); *B23B 39/00* (2013.01); *B25F 5/00* (2013.01); *B23B 2260/128* (2013.01)

(58) Field of Classification Search
CPC ..... B25F 5/00; B23B 39/00; B23B 2260/128; G01V 3/088; B23Q 5/58; B23Q 11/00; B23Q 11/0092; F16P 3/148
USPC .............. 173/2, 3, 4, 5, 6, 11, 176, 182
See application file for complete search history.

(56) References Cited

U.S. PATENT DOCUMENTS

| | | | |
|---|---|---|---|
| 4,976,164 A * | 12/1990 | Lentino | F16H 57/021 30/393 |
| 6,471,106 B1 | 10/2002 | Reining | |
| 7,145,329 B2 | 12/2006 | Favre-Bulle | |
| 7,712,546 B2 * | 5/2010 | Tokunaga | B25B 21/00 173/156 |
| 8,919,456 B2 * | 12/2014 | Ng | B25B 23/147 173/4 |
| 2011/0095771 A1 * | 4/2011 | Reime | G01V 3/088 324/686 |
| 2011/0162860 A1 * | 7/2011 | Gut | B25F 5/001 173/1 |
| 2013/0127262 A1 | 5/2013 | Roser | |
| 2017/0076564 A1 | 3/2017 | Cruz-Hernandez et al. | |
| 2017/0221325 A1 | 8/2017 | Cruz-Hernandez et al. | |
| 2017/0334087 A1 * | 11/2017 | Gass | F16P 3/147 |
| 2019/0063679 A1 | 2/2019 | Mergener | |

(Continued)

FOREIGN PATENT DOCUMENTS

| | | | | |
|---|---|---|---|---|
| CN | 106132649 | * | 11/2016 | .............. F16P 3/148 |
| DE | 10326066 A1 | | 1/2005 | |

(Continued)

OTHER PUBLICATIONS

Extended European Search Report for European Patent Application No. 21193013.6 dated Jan. 4, 2022 (7 pp.).

(Continued)

*Primary Examiner* — Thanh K Truong
*Assistant Examiner* — Linda J. Hodge
(74) *Attorney, Agent, or Firm* — Banner & Witcoff, Ltd.

(57) ABSTRACT

An electric tool includes an output part that comes into contact with a working target to process the working target, a motor that drives the output part, and a sensor that measures capacitance of a metal part comprising the output part. The electric tool detects a foreign object based on a change in the capacitance measured by the sensor.

11 Claims, 9 Drawing Sheets

(56) References Cited

U.S. PATENT DOCUMENTS

| | | | | |
|---|---|---|---|---|
| 2019/0143501 A1* | 5/2019 | Wong | ..................... | H02P 6/08 |
| | | | | 173/5 |
| 2019/0172328 A1 | 6/2019 | Cruz-Hernandez et al. | | |
| 2022/0011458 A1* | 1/2022 | Chen | ..................... | G01V 3/088 |
| 2023/0139444 A1* | 5/2023 | Kok | ..................... | H03K 17/962 |
| | | | | 324/686 |

FOREIGN PATENT DOCUMENTS

| | | | | |
|---|---|---|---|---|
| DE | 102009045944 A1 | 4/2011 | | |
| DE | 102018216569 A1 | 4/2020 | | |
| EP | 2014422 A1 | 1/2009 | | |
| GB | 2466383 A | 6/2010 | | |
| JP | H05-264742 A | 10/1933 | | |
| JP | H07-205052 A | 8/1995 | | |
| JP | 2017-059209 A | 3/2017 | | |
| WO | WO-2012025456 A1 * | 3/2012 | ........... | B27G 19/003 |
| WO | WO-2021093835 A1 * | 5/2021 | ............ | B26B 19/14 |

OTHER PUBLICATIONS

Jan. 3, 20240—(JP) Notice of Reasons for Refusal—JP App 2020-141771, Eng Tran.

\* cited by examiner $$\text{DETECTED CAPACITANCE (Cndet)} = \frac{Cx1 \cdot Co}{(Cx1 + Co)}$$

Co: CAPACITANCE BETWEEN ELECTRIC TOOL AND GROUND
Cx1: CAPACITANCE BETWEEN OUTPUT PART AND GROUND
Cx2: CAPACITANCE BETWEEN FOREIGN OBJECT AND GROUND
Ro: RESISTANCE BETWEEN FOREIGN OBJECT AND GROUND (WHEN Ro IS LARGE)
$$\text{DETECTED CAPACITANCE (Cdet)} = \frac{(Cx1+Cx2) \cdot Co}{((Cx1+Cx2)+Co)}$$

(WHEN Ro IS SMALL)
DETECTED CAPACITANCE (Cdet) = Co

Co: CAPACITANCE BETWEEN ELECTRIC TOOL AND GROUND
Cx1: CAPACITANCE BETWEEN OUTPUT PART AND GROUND
Cx2: CAPACITANCE BETWEEN FOREIGN OBJECT AND GROUND
Ro: RESISTANCE BETWEEN FOREIGN OBJECT AND GROUND

ELECTRIC TOOL

CROSS-REFERENCE TO RELATED APPLICATION(S)

This application is based upon and claims the benefit of priority from prior Japanese patent application No. 2020-141771, filed on Aug. 25, 2020, the entire contents of which are incorporated herein by reference.

TECHNICAL FIELD

The disclosure relates to an electric tool capable of detecting a foreign object while processing a working target.

BACKGROUND ART

When performing a work with an electric tool, a foreign object may be hidden inside a working target. Fax example, when drilling a concrete with a drill, a rebar and a metal piping may be buried inside the concrete. If a tip of a tool accidentally comes into contact with a foreign object such as a rebar and a metal piping, a tool or a structure may be damaged.

As a means for solving such a problem, for example, PTL 1 describes a metal detector capable of detecting a foreign object. A foreign object can be detected before a work by putting the metal detector against a wall.

Further, PTL 2 discloses an electric tool having a foreign object detecting function. In the invention disclosed in PTL 2, when a blade part at the tip comes into contact with a metal object, a closed circuit is formed via ground, and the contact is detected by the current flowing at this time.

CITATION LIST

Patent Literature

PTL 1: JPH05-264742A
PTL 2: JPH07-205052A

SUMMARY OF INVENTION

However, in the metal detector as disclosed in PTL 1, the construction position and depth must be determined before starting a work, and detection cannot be performed during the work. Further, since it is difficult to detect a foreign object far from a wall surface, there is a possibility that a foreign object, a thin rebar, a hollow metal piping, and the like they are hidden in the inner side cannot be detected.

In this regard, when the electric tool as disclosed in PTL 2 is used, detection can be performed during a work, and a foreign object near the tip of the tool can be detected. However, since the electric tool disclosed in PTL 2 needs to be grounded by using a grounding wire, even a rechargeable electric tool without a power supply cord requires a grounding wire, which causes a problem that the handling of the tool becomes poor. Further, since the metal to be detected must also be grounded, there is a risk that a rebar and a metal piping having high grounding resistance cannot be detected.

Therefore, an object of the present disclosure is to provide an electric tool capable of detecting a foreign object with high accuracy during a work.

In order to solve the above problem, an electric tool of the present disclosure includes an output part that comes into contact with a working target to process the working target; a motor that drives the output part; and a sensor that measures capacitance of a metal part comprising the output part, and the electric tool detects a foreign object based on a change in the capacitance measured by the sensor.

As described above, the electric tool of the present disclosure includes the sensor for measuring the capacitance of the metal part including the output part, and detects a foreign object based the change in the capacitance measured by the sensor. That is, the electric tool detects a foreign object by detecting the difference in capacitance between when the output part does not approach or touch an object having a large capacitance such as metal and when the output part approaches or touches an object having a large capacitance.

According to such a configuration, it is not necessary to use a metal detector different from the electric tool, and it is possible to detect a foreign object during a work, so that workability is good. Further, since a foreign object buried in a deep position or a foreign object that is not grounded can be detected, it is possible to detect a foreign object with high accuracy. Further, since it is not necessary to connect a grounding wire to the electric tool, the handling of the electric tool can be improved.

A foreign object to be detected is not necessarily limited to metal, and a foreign object other than metal, for example, a human body may be detected. Specifically, by controlling the motor to stop when a human body is detected, it is possible to realize a protection function that enhances safety.

DESCRIPTION OF EMBODIMENTS

An embodiment of the present disclosure will be described with reference to the drawings. In the present embodiment, a hammer drill 10 will be described as an example of an electric tool.

Figure 4:
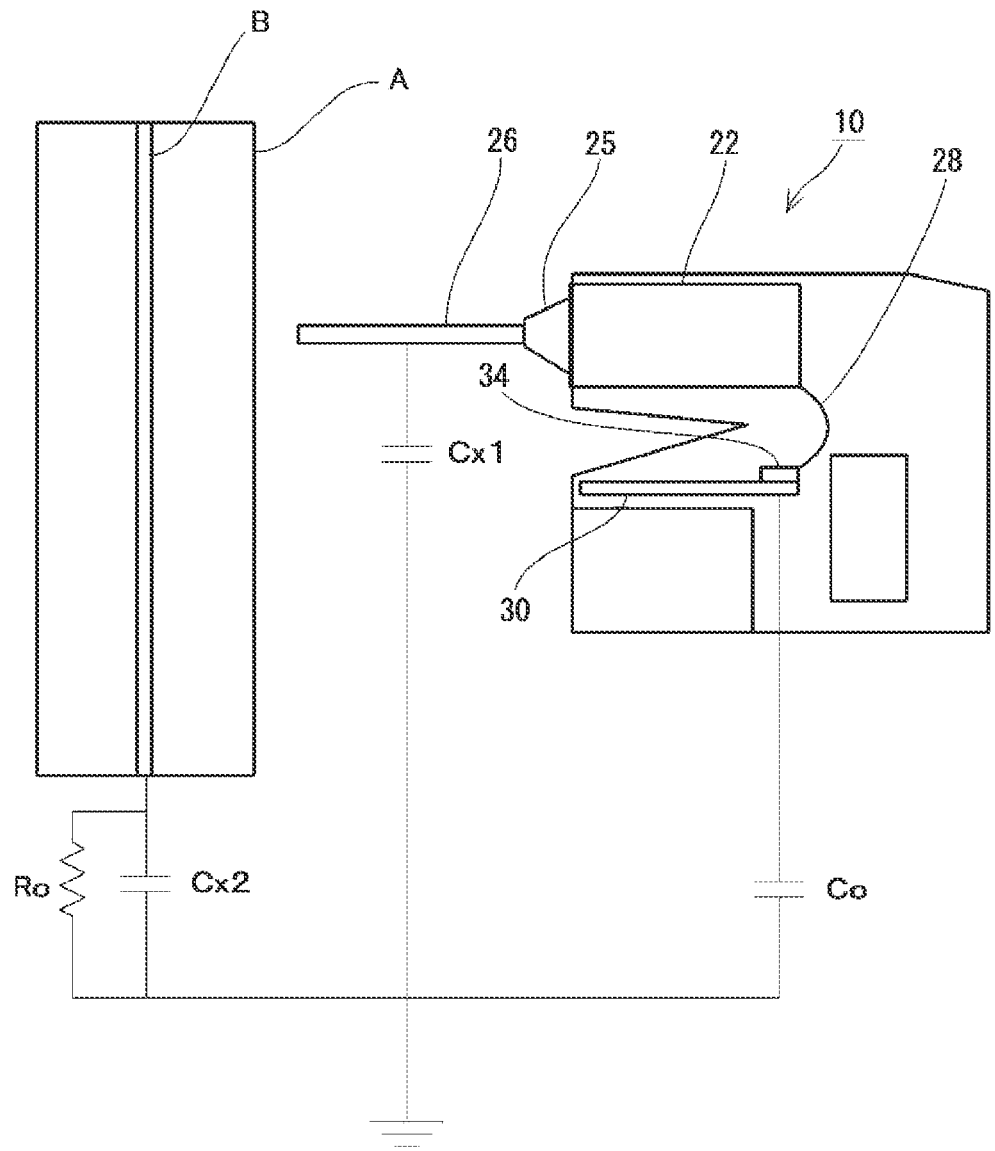
FIG. 4 is a view for explaining a change in capacitance, showing a state before a foreign substance is detected.
Figure 5:
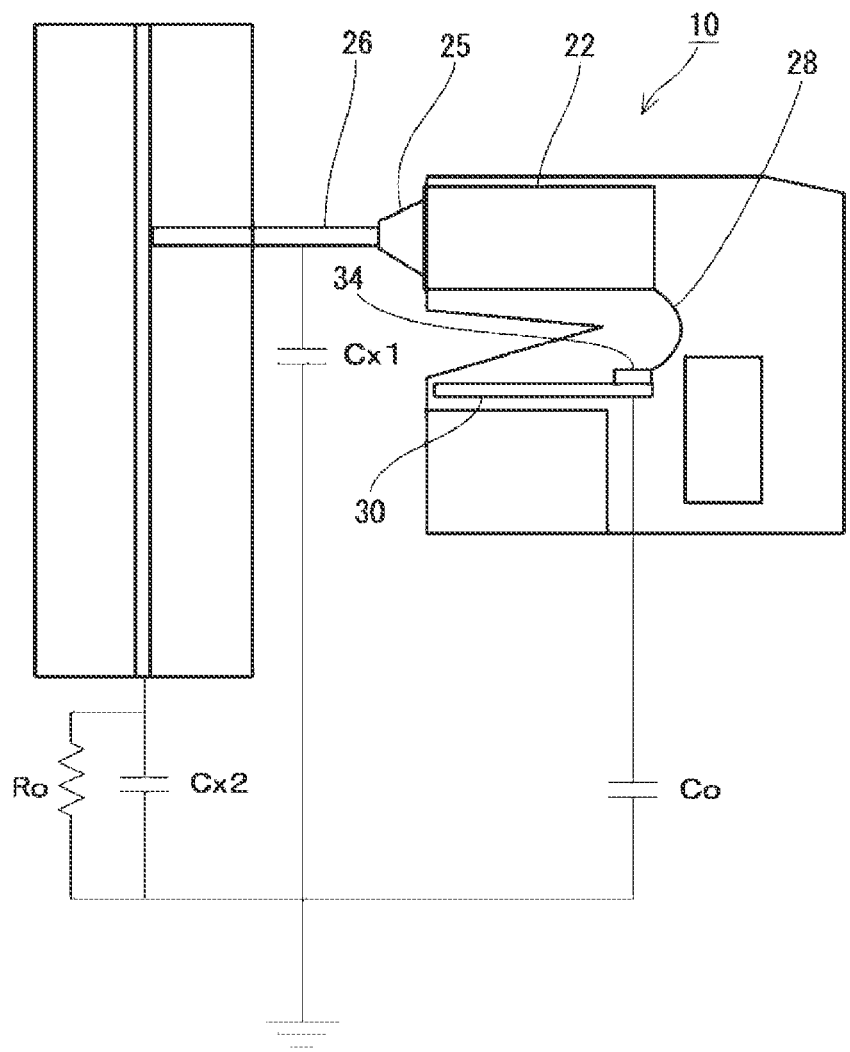
FIG. 5 is a view for explaining a change in capacitance, showing a state when a foreign substance is detected.

As shown in FIGS. 4 and 5, the hammer drill 10 according to the present embodiment is an electric tool capable of drilling or the like a working target such as a concrete A.

Figure 1:
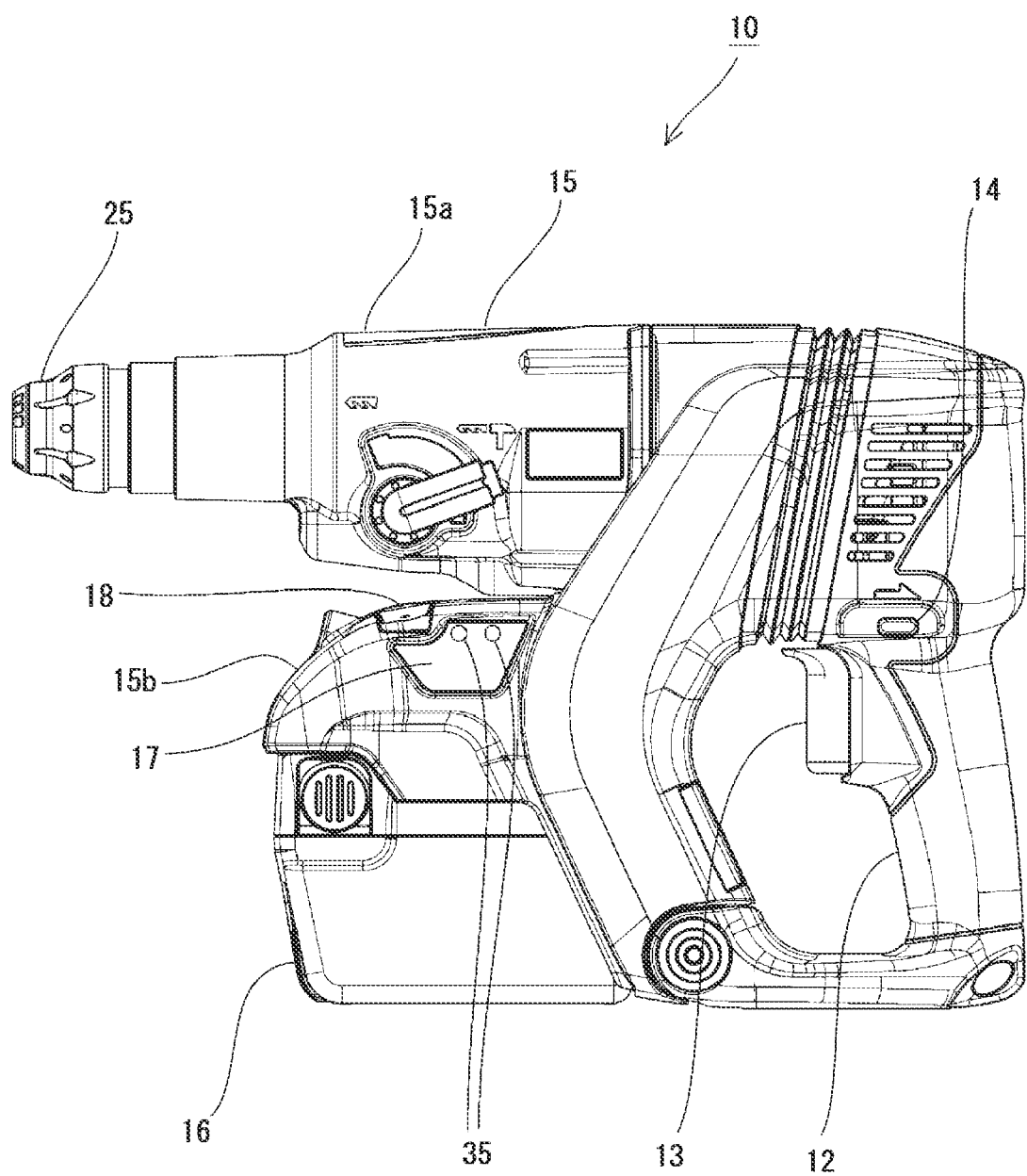
FIG. 1 is an external view of a hammer drill.

As shown in FIG. 1, the hammer drill 10 according to the present embodiment is a hand-held tool that includes a grip housing 12 that can be gripped by a worker and a main housing 15 provided in front of the grip housing 12. The grip housing 12 is provided with a trigger 13 that can be pulled. The trigger 13 is provided at a position where an index finger of a worker is applied when the worker grips a rod-shaped grip. When the worker pulls the trigger 13, a built-in motor 20 starts to rotate, and a tip tool 26 described later is driven.

A rotation switching part 14 for switching the rotation direction of the motor 20 is provided in the vicinity of the trigger 13. The rotation switching part 14 is a rod-shaped member penetrating the grip housing 12 and is attached to the grip housing 12 to be slidable right and left. The rotation switching part 14 can be pushed in from both side surfaces of the grip housing 12 and is configured so that the rotation direction of the motor 20 is switched depending on the position of the rotation switching part 14. For example as shown in FIG. 1, when the rotation switching part 14 is pushed in from the right side and protrudes to the left side, the motor 20 rotates in a forward direction. When the rotation switching part 14 is pushed in from the left side and protrudes to the right side, the motor 20 rotates in a reverse direction.

The main housing 15 includes a cylindrical mechanism accommodating part 15a that accommodates a mechanism part 24 driven by the motor 20, and a battery mounting part 15b for mounting a battery 16.

Figure 2:
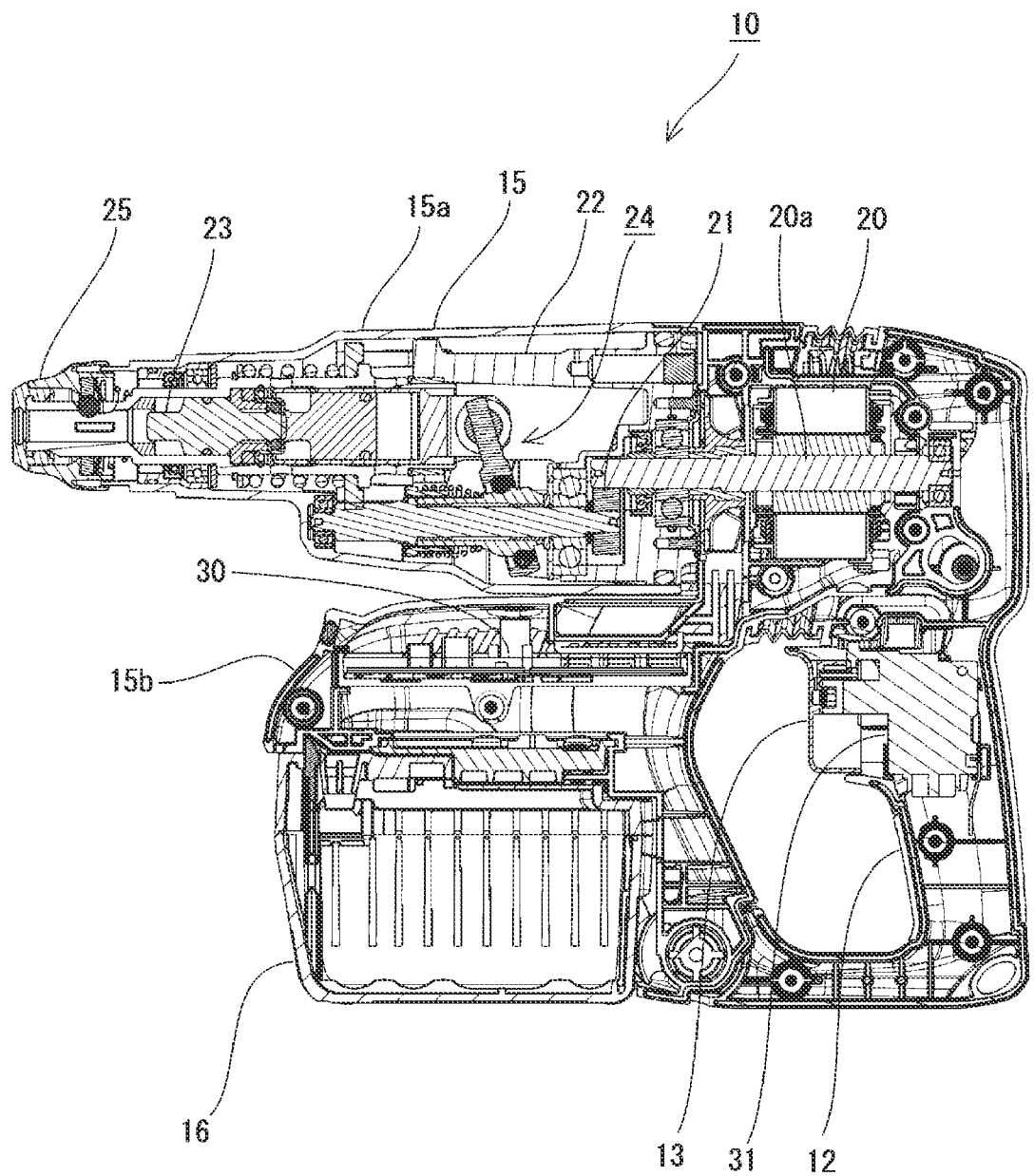
FIG. 2 is a sectional view of the hammer drill.

As shown in FIG. 2, a gear 21, the mechanism part 24, an intermediate part 23, and the like are accommodated inside the mechanism accommodating part 15a.

The gear 21 is a gear for transmitting a rotational force of the motor 20 to the mechanism part 24. The gear 21 according to the present embodiment rotates by engaging with a gear attached to an output shaft 20a of the motor 20. The gear 21 is incorporated in a metal case 22 accommodated inside the mechanism accommodating part 15a.

The mechanism part 24 is driven by a rotational force of the motor 20 transmitted via the gear 21 described above. The mechanism part 24 according to the present embodiment can convert a rotational force into an impact striking force, thereby striking the intermediate part 23 described later while rotating the intermediate part 23.

The intermediate part 23 is a member that is accommodated inside the main housing 15 to be movable back and force and rotatable. The intermediate part 23 is rotated and struck by the mechanism part 24 to apply a rotational force and a striking force to the tip tool 26 described later.

A chuck part 25 to which the tip tool 26 can be removably attached is provided at the tip of the mechanism accommodating part 15a. A worker can attach an arbitrary tip tool 26 to the chuck part 25 and use it according to the work content. When machining a working target with the tip tool 26 (for example, when drilling the concrete A), the tip tool 26 may be brought into contact with the working target (the concrete A) and the trigger 13 may be pulled.

The battery mounting part 15b is configured so that the battery 16 serving as a power source of the hammer drill 10 can be attached and detached. Since the hammer drill 10 according to the present embodiment is operated by an electric force supplied from the battery 16, a power supply cable is not required.

As shown in FIG. 1, a display panel 17 is provided on the side surface of the battery mounting part 15b. A display device such as an LED 35 is arranged on the display panel 17, and various information such as the state of the hammer drill 10 can be displayed. For example, the display panel 17 notifies a worker when a foreign object is detected. Further, the display panel 17 may display the setting contents set by a sensitivity change switch 32 described later, the setting contents set by a detection changeover switch 33 described later, and the like.

Further, as shown in FIG. 1, an operation panel 18 is provided on an upper surface of the battery mounting part 15b. An input means such as a button that can be operated by a user is arranged on the operation panel 18, and the mode and the like of the hammer drill 10 can be input. For example, the operation panel 18 may be provided to operate the sensitivity change switch 32 and the detection changeover switch 33, which will be described later.

Further, as shown in FIG. 2, a control board 30 is arranged inside the battery mounting part 15b. A CPU, ROM, RAM, etc. are mounted on the control board 30 and the CPU executes a predetermined program, whereby a control part 38 that controls various input devices and output devices is configured.

Figure 3:
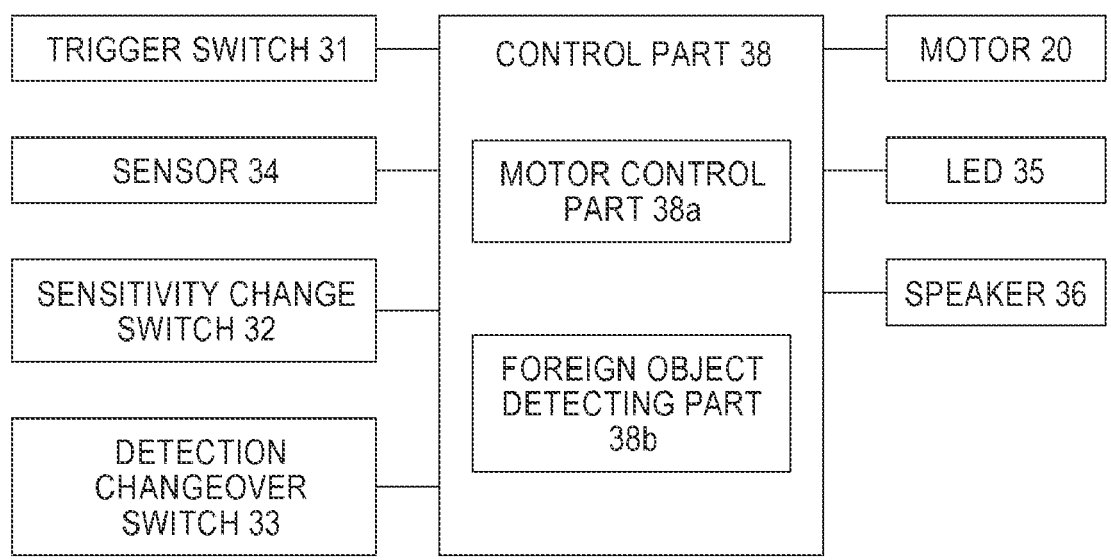
FIG. 3 is a block diagram schematically showing a configuration of the hammer drill.

An input device as shown in FIG. 3 is connected to the control part 38. That is, a trigger switch 31, a sensor 34, the sensitivity change switch 32, and the detection changeover switch 33 are connected to the control part 38. The input device is not limited to the input device shown in FIG. 3 and may include other input devices.

The trigger switch 31 is a switch for detecting that a user has pulled the trigger 13. As shown in FIG. 2, the trigger switch 31 is accommodated inside the grip housing 12. When the trigger 13 is pulled, the trigger switch 31 is pressed and an operation signal is output to the control part 38. Upon receiving the operation signal, the control part 38 executes a control to rotate the motor 20 in a direction designated by the rotation switching part 14.

The sensor 34 is provided for detecting that the tip tool 26 has approached or touched a foreign object, and is a capacitance sensor that measures the capacitance of a metal part including the tip tool 26. The control part 38 according to the present embodiment detects a foreign object based on the change in the capacitance measured by the sensor 34.

The sensor 34 according to the present embodiment is a self-capacitance type capacitance sensor mounted on the control board 30 and can detect a change in capacitance by one sensor electrode. The electrode of the sensor 34 is configured to be electrically connected to the tip tool 26. Therefore, when the tip tool 26 approaches or touches an object (metal or the like) having a large capacitance, the sensor 34 detects that the capacitance has increased.

The electrode of the sensor 34 according to the present embodiment is not directly connected to the tip tool 26, but is electrically connected to the tip tool 26 via the metal case 22 in which a component for operating the tip tool 26 is accommodated. Specifically, as shown in FIG. 4, the electrode of the sensor 34 is connected to the metal case 22 via an electric wire 28. Since the metal case 22 is electrically connected to the tip tool 26 via various built-in components (the gear 21 or the like), the sensor 34 and the tip tool 26 can be electrically connected when the sensor 34 and the metal case 22 are electrically connected. As a method of attaching the electric wire 28 to the metal case 22, the tip of the electric wire 28 may be crimped to a round terminal, and the round terminal may be screwed to the metal case 22. Alternatively, the tip of the electric wire 28 may be directly soldered to the metal case 22. When the electrode of the sensor 34 is connected to the metal case 22 in this manner, it is not necessary to attach the electric wire 28 or the like to the tip tool 26, and therefore, the degree of freedom in the layout of the internal structure can be kept high.

FIGS. 4 and 5 are provided for explaining how the sensor 34 detects a foreign object. As shown in FIG. 4, in a state before the tip tool 26 approaches or touches a foreign object (metal piping B), the capacitance detected by the sensor 34 is relatively small. Specifically, when a capacitance between the electric tool and the ground is defined as Co and a capacitance between the output part and the ground is defined as $Cx1$, a capacitance $Cndet$ detected by the sensor 34 is obtained by approximately "$Cx1 \times Co \div (Cx1+Co)$".

On the other hand, as shown in FIG. 5, in a state where the tip tool 26 approaches or touches a foreign object such as the metal piping B, the capacitance detected by the sensor 34 becomes relatively larger than the state shown in FIG. 4. Specifically, the capacitance between the electric tool and the ground is defined as Co, the capacitance between the output part and the ground is defined as Cx1, a capacitance between the foreign object and the ground is defined as Cx2, and a resistance between the foreign object and the ground is defined as Ro. When Ro is large, a capacitance Cdet detected by the sensor 34 is obtained by approximately "(Cx1+Cx2)×Co÷((Cx1+Cx2)+Co)". Further, when Ro is small, the capacitance Cdet detected by the sensor 34 is approximately "Co".

Here, if "Co", "Cx1", and "Cx2" are all positive values, "Cdet−Cndet" will always be a positive value, and "Cdet>Cndet". That is, the capacitance detected by the sensor 34 is larger in the state where the tip tool 26 approaches or touches the foreign object than in the state before the tip tool 26 approaches or touches the foreign object. In this way, when the tip tool 26 approaches or touches the foreign object, the capacitance detected by the sensor 34 is larger, so that the foreign object can be detected.

Specifically, in the present embodiment, the capacitance detected by the sensor 34 in a state (state in FIG. 4) where the tip tool 26 does not approach or touch a foreign object is set as an initial value, and a foreign object detection threshold is set by adding a predetermined additional value to the initial value. Further, when the sensor 34 detects a capacitance exceeding the foreign object detection threshold, it is determined that the tip tool 26 approaches or touches a foreign object.

The above-mentioned initial value may be acquired at the timing when the motor 20 starts to rotate (when the trigger 13 is operated and the tool is operated).

Further, the above-described foreign object detection threshold may be dynamically changed according to the operation state of the tool. That is, the capacitance detected by the sensor 34 may fluctuate due to the influence of the rotation speed of the motor 20 and the dust of the concrete A and the like. Therefore, when the capacitance changes little by little, the foreign object detection threshold may be slid according to this change. Further, foreign object detection may be controlled so as not to be performed until the rotation speed of the motor 20 reaches a predetermined rotation speed set in advance.

The sensitivity change switch 32 is a switch for inputting the sensitivity of the above-described foreign object detection from the outside. For example, the sensitivity change switch 32 is a switch capable of gradually raising or lowering the above-described threshold. When the sensitivity of the foreign object detection is increased by the sensitivity change switch 32, the above-described foreign object detection threshold can be lowered. On the other hand, when the sensitivity of the foreign object detection is lowered by the sensitivity change switch 32, the above-described foreign object detection threshold can be increased. Since the sensitivity of the foreign object detection can be changed in this manner, a foreign object can be detected with optimum settings according to the type and size of the tip tool 26 and the type of the working target.

The detection changeover switch 33 is a switch for inputting an operation when a foreign object is detected from the outside. For example, the detection changeover switch 33 is a switch capable of switching whether or not to execute a predetermined foreign object detection operation (notification to a user, the stop of the motor 20, etc.) when a foreign object is detected. By proving such a detection changeover switch 33, it is possible to make the function of detecting a foreign object disabled. Therefore, when it is not desired to detect a foreign object, such as when processing a metal, the work can be performed with the foreign object detection function disabled.

In the above description, the detection changeover switch 33 is used to switch whether or not to execute the foreign object detection operation. However, the present disclosure is not limited to this, and the detection changeover switch 33 may be used to switch whether or not a foreign object can be detected by the sensor 34. That is, instead of making it possible to turn off the operation when a foreign object is detected, foreign object detection itself may be turned off.

Subsequently, the control part 38 will be described. The control part 38 according to the present embodiment functions as, for example, a motor control part 38a, a foreign object detecting part 38b, and the like.

The motor control part 38a is a program or circuit that controls the rotation of the motor 20. The motor control part 38a controls the rotation start or rotation stop of the motor 20 based on the signal from the trigger switch 31. However, when the foreign object detecting part 38b described later detects a foreign object and receives a stop signal from the foreign object detecting part 38b, a control for stopping the motor 20 may be executed.

The foreign object detecting part 38b is a program or circuit that detects a foreign object by monitoring the value of capacitance measured by the sensor 34 and comparing the value of capacitance with the foreign object detection threshold. The foreign object detecting part 38b according to the present embodiment acquires an initial value of capacitance when the motor 20 starts to rotate, and adds a predetermined additional value to the initial value of capacitance to set the foreign object detection threshold. At this time, the additional value added to the initial value is determined according to the sensitivity of the foreign object detection set by the sensitivity change switch 32. Thereafter, the threshold may be corrected according to the rotation speed of the motor 20 or the like. When the value of capacitance measured by the sensor 34 exceeds the foreign object detection threshold, a predetermined foreign object detection operation is executed if a foreign object detection function is enabled. Even when the value of capacitance measured by the sensor 34 exceeds the foreign object detection threshold, a foreign object detection operation is not executed if a foreign object detection function is disabled.

An actual foreign object detection operation executed when a foreign object is detected is, for example, stopping the motor 20 or notifying a worker. These may be executed at the same time, or only one of them may be executed.

When stopping the motor 20 at the time of foreign object detection, the foreign object detecting part 38b outputs a stop signal to the motor control part 38a when a foreign object is detected. Upon receiving the stop signal, the motor control part 38a stops the motor 20 when the motor 20 is rotating in the forward direction (when the motor 20 is rotating in the direction of processing the working target). When the motor 20 is stopped due to the foreign object detection in this way, the motor 20 cannot rotate in the forward direction until a predetermined return operation (in the present embodiment, all operations except the operation of rotating the motor 20 in the forward direction. For example, the operation of revering the motor 20 once, the operation of changing the operation mode of the hammer drill 10, the operation of turning the power on again, and the like) is performed. With this control, it is possible to prevent accidental re-drilling after detecting a foreign object.

When the motor 20 is rotating in the reverse direction (when the motor 20 is rotating in the direction of discharging the tip tool 26 from a hole) at the time of receiving the stop signal, the motor control part 38a does not need to stop the motor 20. Further, since it is necessary to rotate the motor 20 in the reverse direction and pull out the tip tool 26 from the hole after a foreign object is detected, the foreign object detection function is disabled when the motor 20 is rotating in the reverse direction.

Further, when notifying a worker at the time of foreign object detection, the foreign object detecting part 38b notifies a worker by using the LED 35, a speaker 36, or the like when a foreign object is detected. The notification method is not limited to the LED 35 and the speaker 36. Other notification methods may be used, or a method of outputting a signal to an external device using wireless or the like may be used.

As described above, the hammer drill 10 according to the present embodiment includes the sensor 34 for measuring the capacitance of the metal part including the output part (the tip tool 26) that comes into contact with a working target to process the working target, and detects a foreign object based on the change in the capacitance measured by the sensor 34. That is, the hammer drill 10 detects a foreign object by detecting the difference in capacitance between when the tip tool 26 does not approach or touch an object having a large capacitance such as metal and when the tip tool 26 approaches or touches an object having a large capacitance.

According to such a configuration, it is not necessary to use a metal detector different from the hammer drill 10, and it is possible to detect a foreign object during the work, so that workability is good. Further, since a foreign object buried in a deep position or a foreign object that is not grounded can be detected, it is possible to detect a foreign object with high accuracy. Further, since it is not necessary to connect a power supply cord (grounding wire) to the hammer drill 10, the handling of the electric tool can be improved.

A foreign object to be detected is not necessarily limited to metal, and a foreign object other than metal, for example, a human body may be detected. Specifically, by controlling the motor 20 to stop when a human body is detected, it is possible to realize a protection function that enhances safety.

(Modification 1)

In the above-described embodiment, the hammer drill 10 has been described as an example of the electric tool. However, the present disclosure is not limited to this and is applicable to other electric tools.

Figure 6:
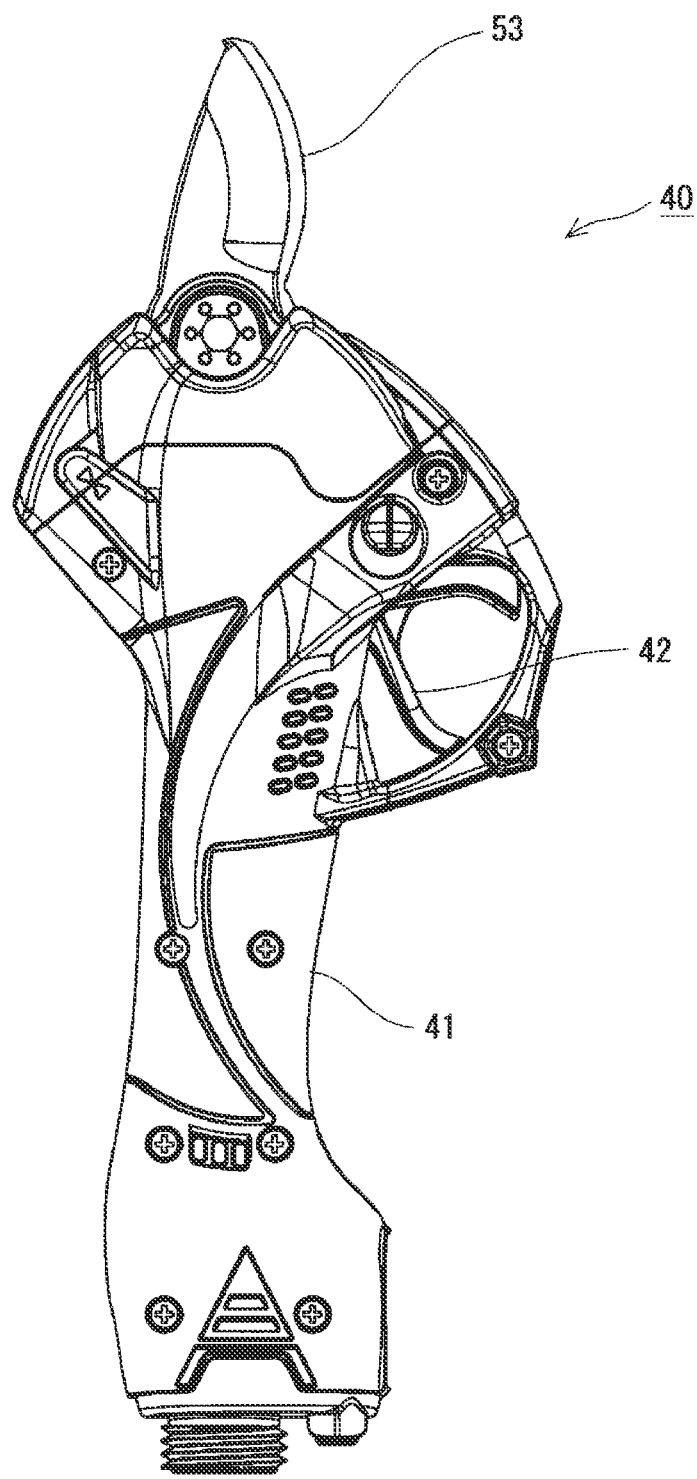
FIG. 6 is an external view of electric scissors according to a first modification.
Figure 7:
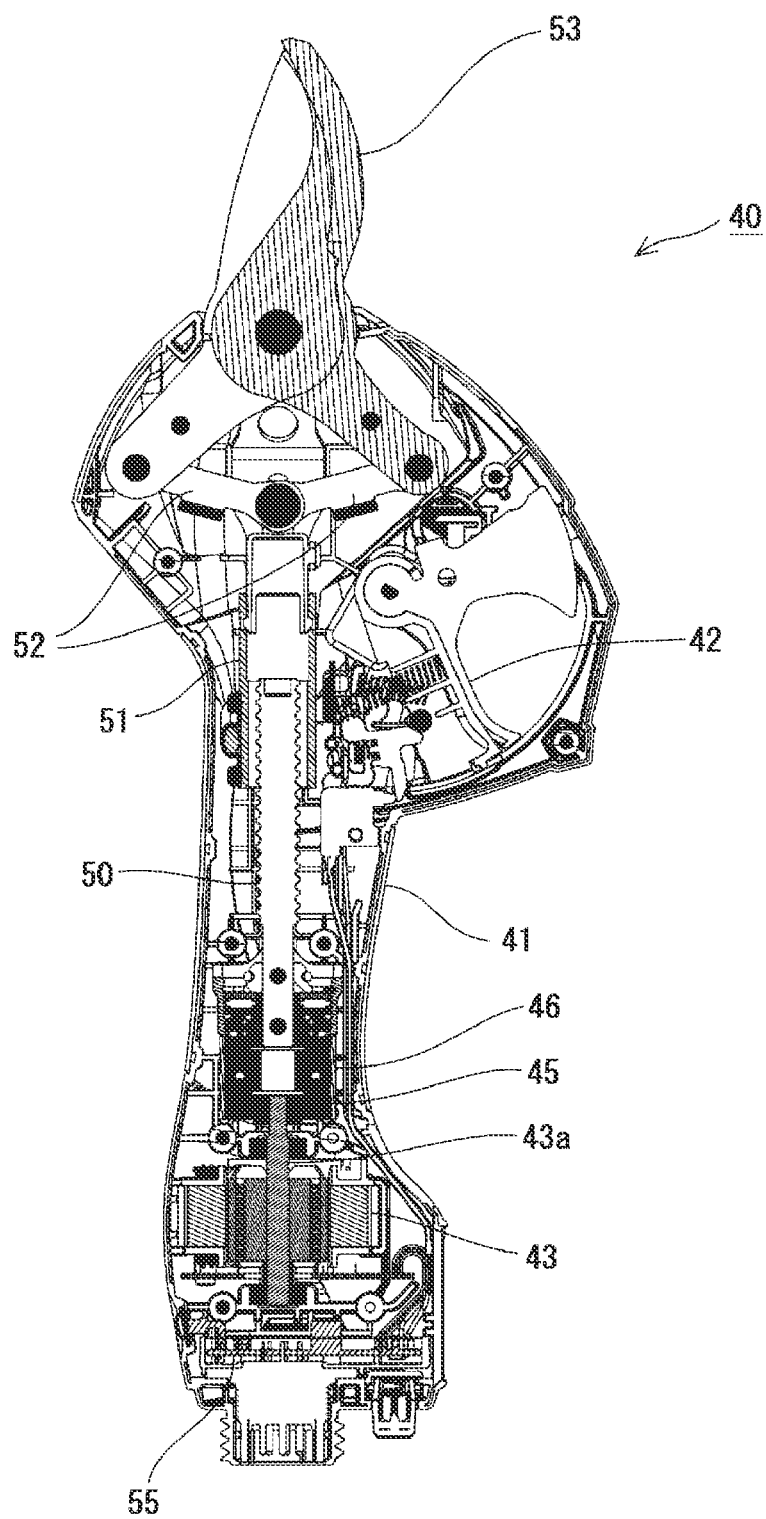
FIG. 7 is a sectional view of the electric scissors according to the first modification.

For example, the present disclosure may be applied to an electric scissors 40 as shown in FIGS. 6 and 7. The electric scissors 40 is an electric tool capable of cutting or the like a working target such as a tree branch.

As shown in FIG. 6, the electric scissors 40 according to this modification is a hand-held tool that includes a housing 41 that can be gripped by a worker. The housing 41 is provided with a trigger 42 that can be pulled. The trigger 42 is provided at a position where an index finger of a worker is applied when the worker grips a rod-shaped grip. When the worker pulls the trigger 42, a built-in motor 43 drives a blade part 53 described later to be opened and closed.

As shown in FIG. 7, a gear 45, a screw shaft 50, a nut 51, a link 52, a control board 55, and the like are accommodated inside the housing 41.

The gear 45 is a gear for transmitting a rotational force of the motor 46 to the screw shaft 50. The gear 45 is incorporated in a metal case 46 accommodated inside the housing 41.

The screw shaft 50 and the nut 51 are components constituting a ball screw and are driven by a rotational force of the motor 43 transmitted via the gear 45. When the screw shaft 50 is rotated by the rotational force of the motor 43, the nut 51 attached to the screw shaft 50 advances and retreats.

The link 52 is a pair of members that are opened and closed according to the advancing and retreating operation of the nut 51. A pair of blade parts 53 are attached to the tips of the pair of links 52. The pair of blade parts 53 are an output part that comes into contact with a working target to process the working target, and are opened and closed according to the opening and closing of the links 52 (in other words, the blade parts 53 are opened and closed according to the rotational operation of the motor 43).

Also in such a configuration, since the sensor 34 similar to the embodiment of the hammer drill 10 described above is provided, it is possible to detect a foreign object approaching or touching the blade parts 53.

As in FIGS. 4 and 5, the electrode of the sensor 34 may be connected to the metal case 46 via an electric wire (not shown). The metal case 46 is electrically connected to the blade part 53 via various built-in components. Therefore, when the sensor 34 and the metal case 46 are connected, the sensor 34 and the blade part 53 can be electrically connected.

(Modification 2)

Figure 8:
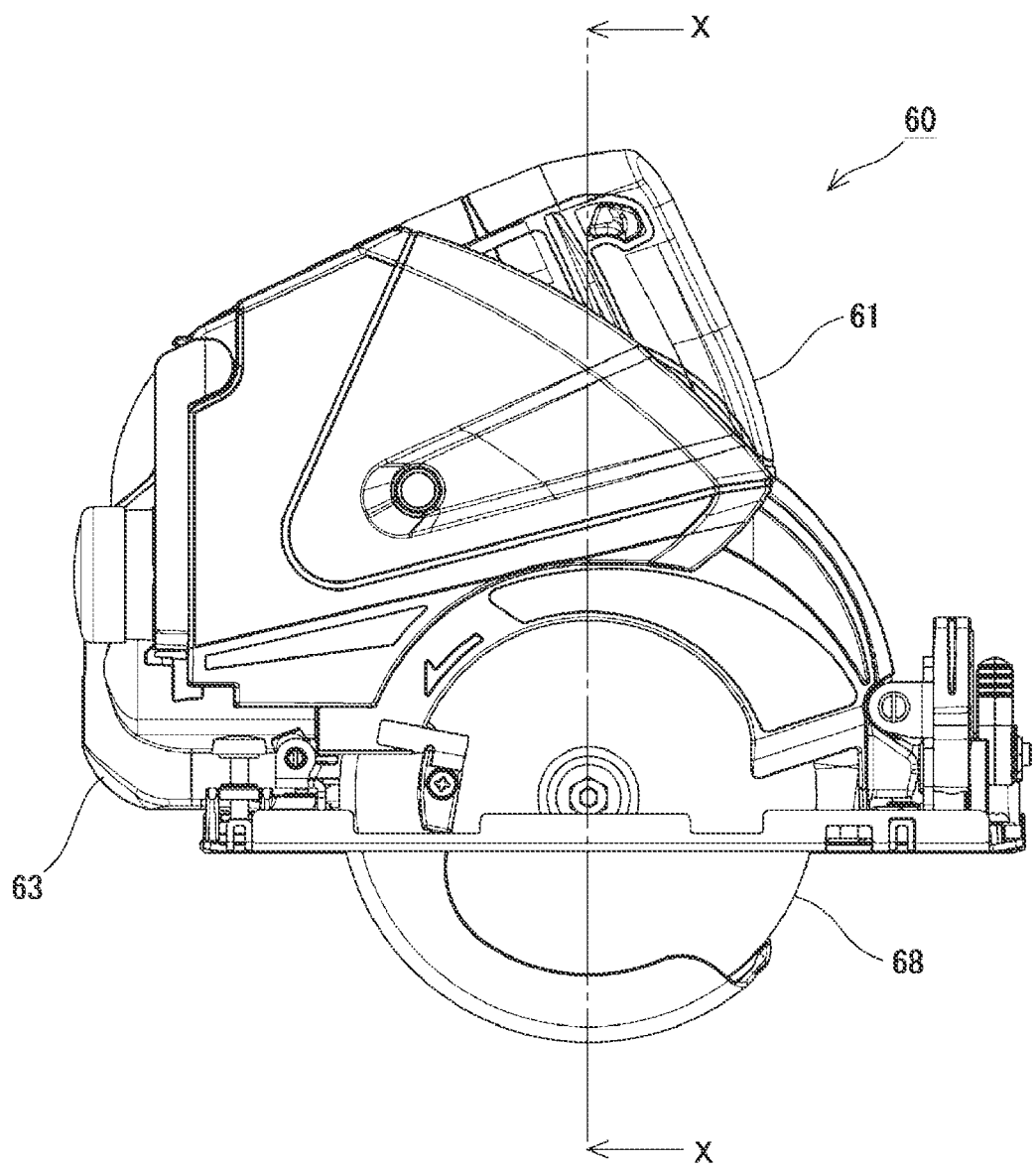
FIG. 8 is an external view of an electric circular saw according to a second modification.
Figure 9:
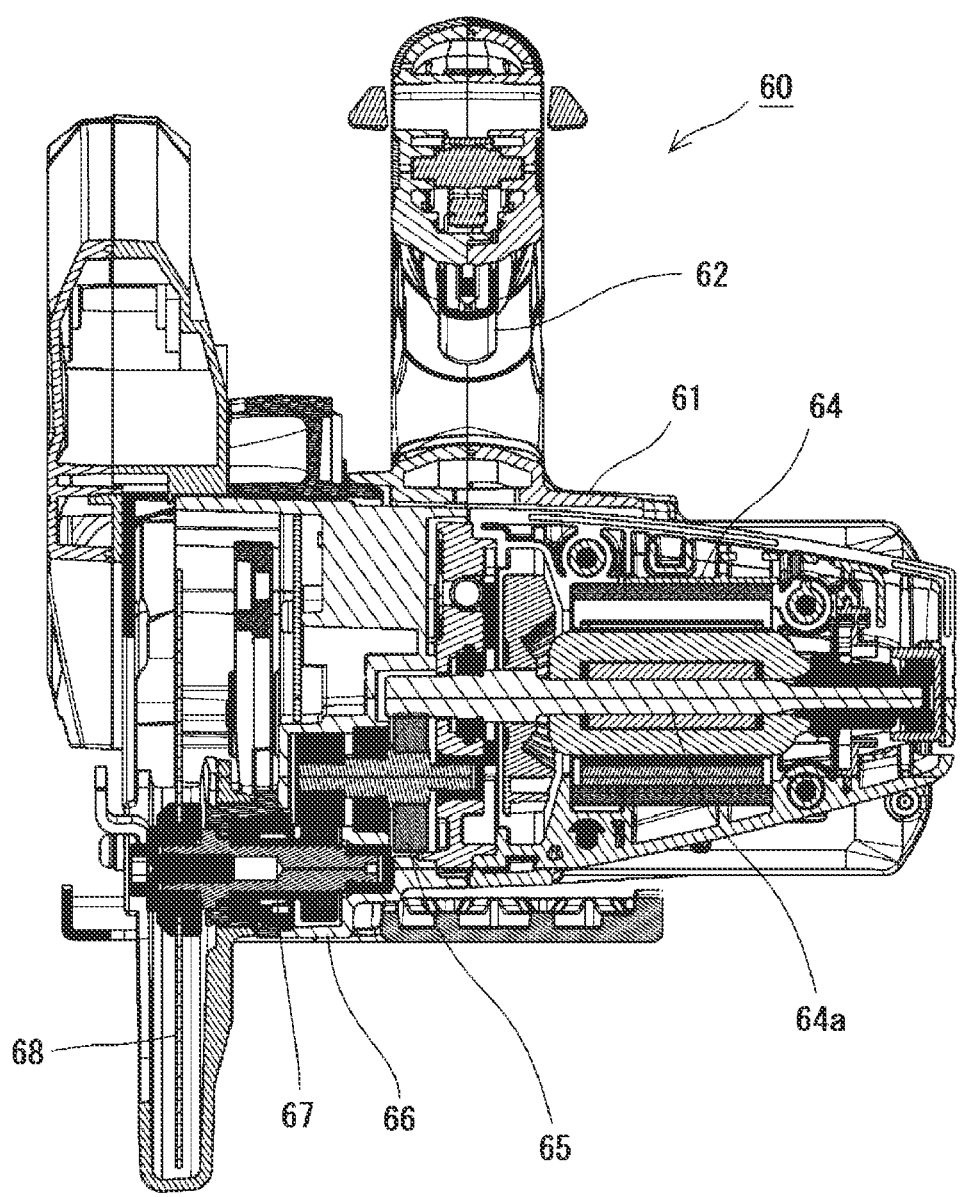
FIG. 9 is a sectional view of the electric circular saw according to the second modification (a sectional view taken along the line X-X in FIG. 8).

The present disclosure may be applied to an electric circular saw 60 as shown in FIGS. 8 and 9. The electric circular saw 60 is an electric tool capable of cutting a working target.

As shown in FIG. 8, the electric circular saw 60 according to this modification is a hand-held tool that includes a housing 61 that can be gripped by a worker. The housing 61 is provided with a trigger 62 (see FIG. 9) that can be pulled. The trigger 62 is provided at a position where an index finger of a worker is applied when the worker grips a rod-shaped grip. When the worker pulls the trigger 62, a built-in motor 64 drives a circular blade part 68 described later to rotate.

As shown in FIG. 9, a gear 65, a saw blade shaft 67, a control hoard (not shown), and the like are accommodated inside the housing 61.

The gear 65 is a gear for transmitting a rotational force of the motor 64 to the saw blade shaft 67. The gear 65 is incorporated in a metal case 66 accommodated inside the housing 61.

The saw blade shaft 67 is a rotation shaft of the circular blade part 68 and rotates according to the rotation of the motor 64. As the saw blade shaft 67 rotates, the blade part 68 (the output part that comes into contact with a working target to process the working target) rotates.

Also in such a configuration, since the sensor 34 similar to the embodiment of the hammer drill 10 described above is provided, it is possible to detect a foreign object approaching or touching the blade part 68.

As in FIGS. 4 and 5, the electrode of the sensor 34 may be connected to the metal case 66 via an electric wire (not shown). The metal case 66 is electrically connected to the blade part 68 via various built-in components. Therefore, when the sensor 34 and the metal case 66 are connected, the sensor 34 and the blade part 68 can be electrically connected.

What is claimed is:

1. An electric tool comprising:
    an output part configured to come into contact with a working target to process the working target;
    a motor configured to drive the output part;
    a gear configured to transmit a rotational force of the motor;
    a metal case incorporating the gear inside the metal case; and
    a self-capacitance sensor including one electrode and an electric wire extending from the electrode to the metal case, and configured to measure capacitance of a metal part including the output part in at least a part of the metal part,
    wherein the self-capacitance sensor is electrically connected to the output part, which is at least the part of the metal part, via the electrode, the electric wire, the metal case and the gear, and
    wherein the electric tool detects a foreign object based on a change in the capacitance of the metal part measured by the self-capacitance sensor.

2. The electric tool according to claim 1, wherein the electric tool controls the motor to stop when the foreign object is detected.

3. The electric tool according to claim 2,
    wherein the electric tool controls the motor to stop when the motor is rotating in a first direction and the foreign object is detected, and
    wherein the motor is not permitted restart rotation in the first direction until a predetermined return operation is performed.

4. The electric tool according to claim 3,
    wherein the electric tool controls the motor not to stop when the motor is rotating in a second direction and the foreign object is detected.

5. The electric tool according to claim 1, wherein the electric tool provides a notification when the foreign object is detected.

6. The electric tool according to claim 1, further comprising:
    a sensitivity change switch for changing a sensitivity of foreign object detection.

7. The electric tool according to claim 1, further comprising:
    a detection changeover switch for disabling the detection of a foreign object.

8. The electric tool according to claim 1, further comprising:
    a detection changeover switch for disabling the detection of a foreign object based on a rotation direction of the motor.

9. The electric tool according to claim 1, wherein an initial value of the capacitance is detected when the motor starts to rotate, and a threshold of the capacitance used for detecting the foreign object is determined based on the initial value.

10. The electric tool according to claim 1, wherein a threshold of the capacitance used for detecting the foreign object is dynamically changed according to an operation state of the electric tool.

11. The electric tool according to claim 1, wherein the foreign object includes at least one of a metal and a human body.

* * * * *